(12) United States Patent
Kohler et al.

(10) Patent No.: US 7,903,278 B2
(45) Date of Patent: Mar. 8, 2011

(54) CAPABILITY NEGOTIATION BETWEEN PRINTER AND TARGET DEVICE

(75) Inventors: Timothy L. Kohler, San Jose, CA (US); Todd Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1694 days.

(21) Appl. No.: 10/763,214

(22) Filed: Jan. 26, 2004

(65) Prior Publication Data

US 2004/0160641 A1  Aug. 19, 2004

Related U.S. Application Data

(63) Continuation of application No. 09/241,849, filed on Feb. 2, 1999, now abandoned.

(51) Int. Cl.
*G06K 15/00* (2006.01)
(52) U.S. Cl. .......... 358/1.18; 358/1.9; 358/2.1; 358/3.11; 358/3.12; 358/1.15; 382/167
(58) Field of Classification Search .......... 358/1.9, 358/3.01, 3.06, 3.09, 3.1, 3.11, 3.12, 3.2, 358/3.23, 3.3, 1.12, 1.13, 1.15, 1.17, 1.18; 382/167

See application file for complete search history.

(56) References Cited

U.S. PATENT DOCUMENTS

| | | | |
|---|---|---|---|
| 5,311,251 A | 5/1994 | Roule et al. .......... 355/77 |
| 5,313,291 A | 5/1994 | Appel et al. .......... 358/501 |
| 5,339,176 A | 8/1994 | Smilansky et al. .......... 358/504 |
| 5,402,361 A * | 3/1995 | Peterson et al. .......... 382/167 |
| 5,416,613 A | 5/1995 | Rolleston et al. .......... 358/518 |
| 5,491,568 A | 2/1996 | Wan .......... 358/518 |
| 5,612,902 A | 3/1997 | Stokes .......... 702/85 |
| 5,625,758 A * | 4/1997 | Schneider et al. .......... 358/1.15 |
| 5,642,202 A | 6/1997 | Williams et al. .......... 358/406 |
| 5,649,073 A | 7/1997 | Knox et al. .......... 395/1.9 |
| 5,699,450 A * | 12/1997 | Stearns et al. .......... 382/156 |
| 5,760,913 A | 6/1998 | Falk .......... 382/167 |
| 5,809,213 A | 9/1998 | Bhattacharjya .......... 358/1.6 |
| 6,023,714 A * | 2/2000 | Hill et al. .......... 715/235 |
| 6,417,931 B2 * | 7/2002 | Mori et al. .......... 358/1.15 |

* cited by examiner

*Primary Examiner* — Edward L Coles
*Assistant Examiner* — Vu B Hang
(74) *Attorney, Agent, or Firm* — Fitzpatrick, Cella, Harper & Scinto

(57) ABSTRACT

A system for determining layout of print data printed by a printer onto a recording medium, in which the recording medium is processed by a target device different from the printer. Printing capabilities of the printer and processing capabilities of the target device are both determined. Then, layout of the print data is determined based on compatible capabilities between the printing capabilities of the printer and the processing capabilities of the target device. The layout preferably is determined through communication with the printer and the target device so as to negotiate the layout.

20 Claims, 11 Drawing Sheets

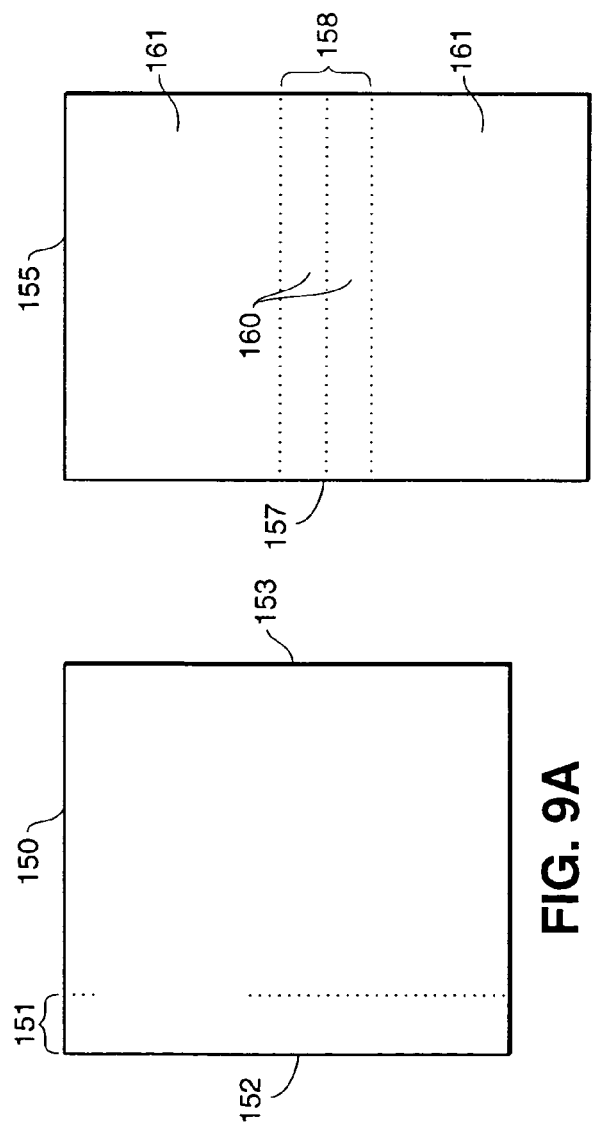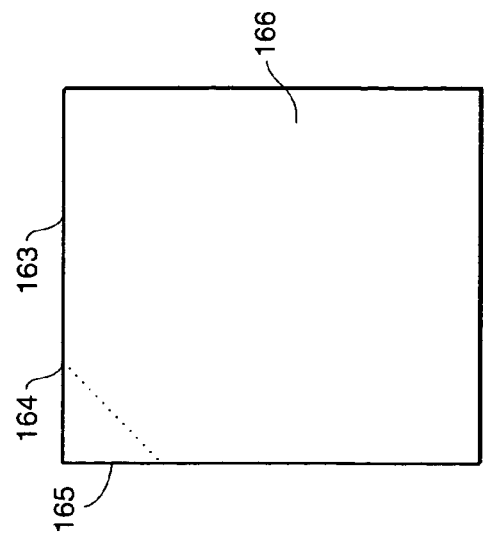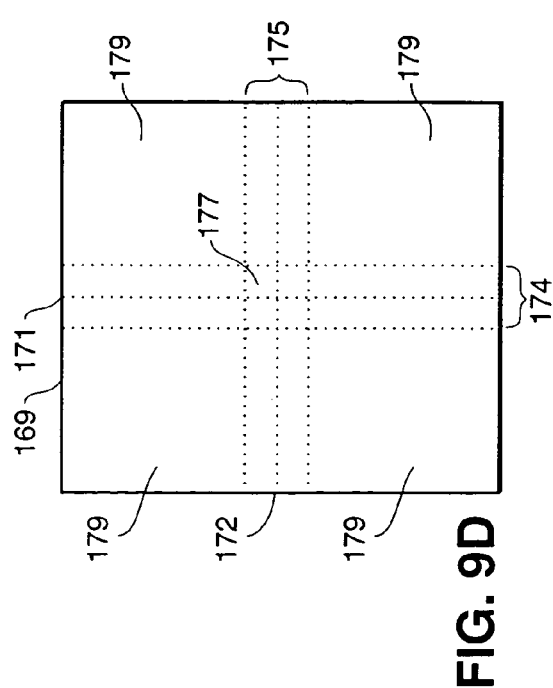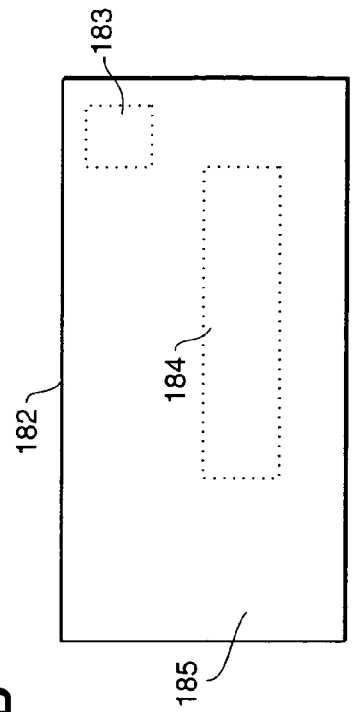

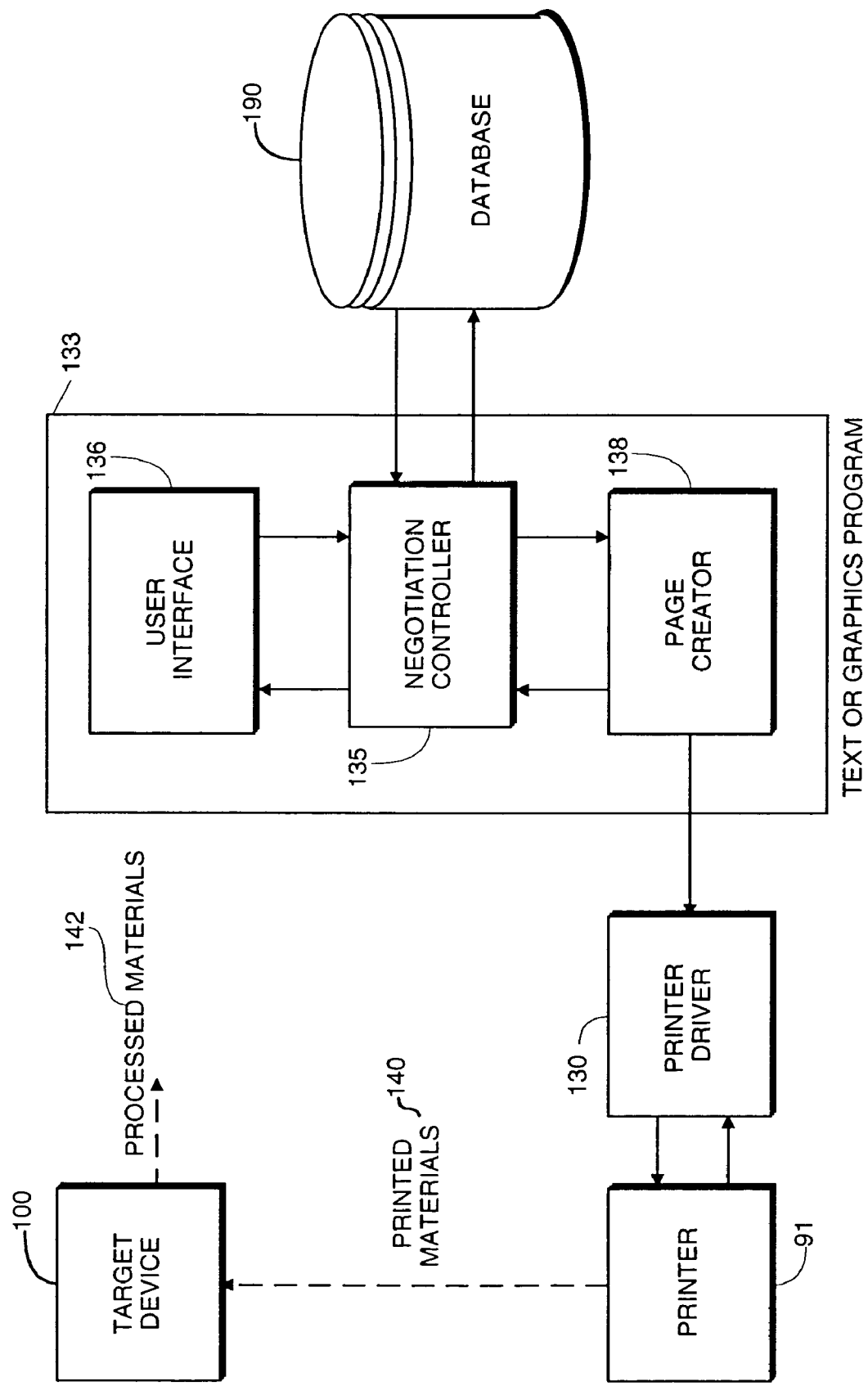

CAPABILITY NEGOTIATION BETWEEN PRINTER AND TARGET DEVICE

BACKGROUND OF THE INVENTION

1. Field of the Invention

The invention is directed to a system for negotiating capabilities between a printer and a target device (such as a paper-folding machine or a scanner) so as to determine a layout of print data printed by the printer and subsequently processed by the target device. In more detail, the invention is related to determining the layout of the print data based on compatible capabilities between the printing capabilities of the printer and the processing capabilities of the target device.

2. Description of the Related Art

Printers such as ink jet printers and laser printers have become common in both business and industry. Typically, a user can configure a layout of print data output by such a printer according to the user's needs, for example through an interface to a driver for the printer or an interface to an application program that generates the print data.

In situations where the output of the printer is tailored for use as an input to a second and different target device, however, the target device might require that the layout be configured in accordance with the processing capabilities of the target device. For example, to calibrate a color printer, a series of differently-colored patches are printed onto a recording medium, and the recording medium is then scanned by a target color measuring device such as an XY table or a strip reader. The color measuring device measures color values for the color patches so as to perform color calibration. Typically, the color measuring device is capable of measuring color patches only if the patches are arranged in a layout that meets certain requirements. For example, the color patches might have to be separated by a specified minimum distance or recorded within specified margins on the recording medium. Thus, the target device (here, the color measuring device) constrains the layout of the printer's output.

Other examples of target devices that typically have processing capabilities that constrain layout include stamp readers, bar code readers, and automatic scoring, folding, stitching, binding, stamping and cutting devices. Additional examples exist.

In conventional systems, a user must manually configure the layout in accordance with the processing capabilities of the target device. This manual configuration is often difficult to .perform and prone to error, resulting in misformatted output from the printer that cannot be processed properly by the target device. In addition, a new layout must be configured for each new type of target device.

SUMMARY OF THE INVENTION

Accordingly, it is an object of the invention to determine a layout of a printer's output in accordance with processing capabilities of a target device.

In one aspect, the invention automatically determines a layout of print data based on compatible capabilities between printing capabilities of a printer and processing capabilities of a target device. Because the layout is determined based in part on the printing capabilities of the printer, the invention ensures that the layout is one that the printer can generate. Because the layout also is determined based in part on the processing capabilities of the target device, the invention ensures that the layout is one that the target device is capable of processing.

In another aspect, the invention determines layout of print data printed by a printer onto a recording medium, in which the recording medium is processed by a target device different from the printer. Printing capabilities of the printer and processing capabilities of the target device are both determined. Then, a layout of the print data is determined based on compatible capabilities between the printing capabilities of the printer and the processing capabilities of the target device.

Printing capabilities of the printer and processing capabilities of the target device can be determined through communication with the printer and the target device, communication with software drivers therefor, or communication with a database that stores data of printing and processing capabilities. If a database is used, the database can store data of printing capabilities of plural different printers and processing capabilities of plural different target devices.

Examples of printing capabilities of a printer include a valid size for a recording medium and a printable area on the recording medium. Examples of processing capabilities of a target device include a valid size for a recording medium, an area on the recording medium that can be processed, an area on the recording medium that cannot be processed, and a minimum distance of separation for images on the recording medium.

In the preferred embodiment, the layout is determined through communication with the printer and the target device so as to negotiate the layout. The layout of the print data is communicated to the printer, and the printer is configured in accordance with the communicated layout. Likewise, the layout of the print data is communicated to the target device, and the target device is configured in accordance with the communicated layout.

Color and monochrome printers are examples of printers for which a layout can be determined according to the invention. Examples of target devices include color measuring devices, stamp readers, bar code readers, and finishing devices such as automatic scoring devices, automatic folding devices, automatic stitching devices, automatic binding devices, automatic stamping devices, and automatic cutting devices.

In another aspect, the invention concerns an apparatus that includes an interface to a printer, an interface to a target device, a memory, and a processor. The memory has a region for storing executable process steps, and the processor is for executing the executable process steps. The executable process steps include steps (a) to determine printing capabilities of the printer; (b) to determine processing capabilities of the target device; and (c) to determine layout of the print data based on compatible capabilities between the printing capabilities of the printer and the processing capabilities of the target device.

In yet another aspect, the invention concerns computer-executable process steps, and a memory medium storing such process steps, that implement a negotiation controller which determines layout of print data printed by a printer onto a recording medium, in which the recording medium is processed by a target device different from the printer. The computer-executable process steps include code to determine printing capabilities of the printer, code to determine processing capabilities of the target device, and code to determine layout of the print data based on compatible capabilities between the printing capabilities of the printer and the processing capabilities of the target device.

This brief summary has been provided so that the nature of the invention may be understood quickly. A more complete understanding of the invention can be obtained by reference

BRIEF DESCRIPTION OF THE DRAWINGS

FIGS. 9A to 9E show examples of layouts that can be processed properly by different target devices.

FIG. 11 illustrates a third embodiment of the invention, in which a negotiation controller communicates with a database so as to determine printing capabilities of a printer and processing capabilities of a target device.

DETAILED DESCRIPTION OF THE PREFERRED EMBODIMENTS

First Embodiment

Figure 1:
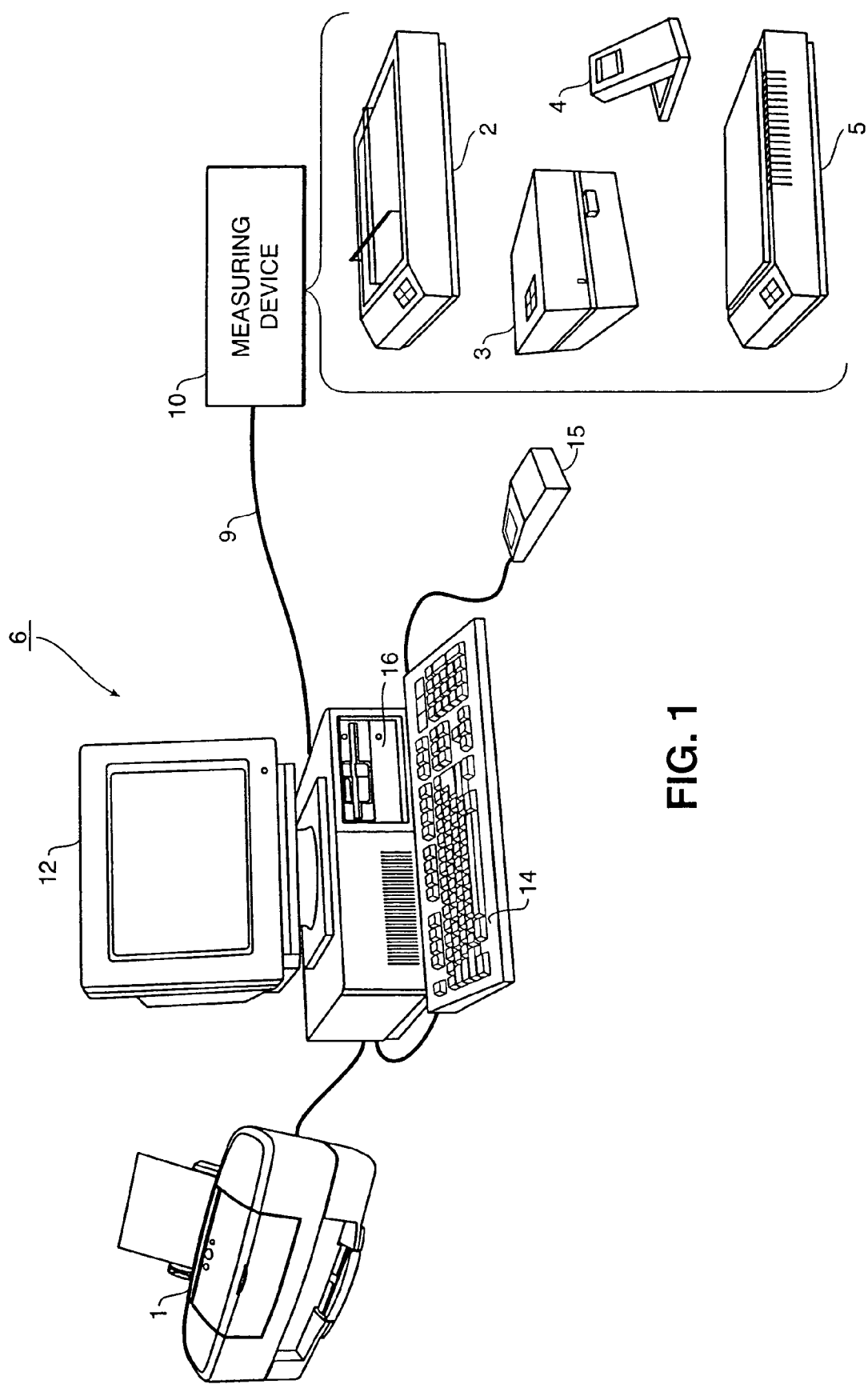
FIG. 1 is a representational view of a first embodiment of the invention, in which color fidelity of a color printer is calibrated using a color measuring device.

FIG. 1 is a representational view of a first embodiment of the invention, in which color fidelity of a color printer is calibrated using a color measuring device. Shown in FIG. 1 are color printer 1 and computer system 6, together with a variety of color measuring devices, such as XY table 2, strip reader 3, hand-held measuring device 4 for reading individual color patches, and scanner 5, which in this embodiment are examples of target devices.

Color printer 1 is depicted in FIG. 1 as an ink jet printer. However, any printer capable of printing color images on recording media can be utilized by this embodiment of the invention, such as ink jet printers and laser printers. Color printer 1 prints color images in response to print jobs received from printer interface 8.

Measuring device 10 is a color measuring device that is used to generate color measurements of color patches input thereto. Examples of measuring device 10 include XY table 2, strip reader 3, and hand-held measuring device 4. These color measuring devices can be any types of color measuring devices, including spectrometers (e.g., spectrophotometers and spectroradiometers), calorimeters, and densitometers. The color measurements generated by color measuring device 10 are transmitted over measuring device interface 9 to computer system 6.

Color patches are input to each of the different types of color measuring devices in different ways, with the color patches constrained to be arranged in different layouts in dependence on the type of device. For example, color patches are input to XY table 2 on a sheet that has an array of patches printed thereon. Color patches are input to strip reader 3 on strips that each have one or more row(s) of patches printed thereon. Color patches are input to hand-held measuring device 4 on any type of recording media that has color patches printed thereon, so long as the color patches are of sufficient size that the hand-held measuring device can be accurately positioned on the patches. Examples of the different constraints for the layouts are explained more fully below with reference to FIGS. 4A and 4B.

Flatbed scanner 5 can also serve as a color measuring device, provided that scanner 5 is properly calibrated. Color patches are input to flatbed scanner 5 in a similar manner as the patches are input to XY table 2, namely on a sheet that has an array of patches printed thereon.

As shown in FIG. 1, computer system 6 is connected to printer 1 through printer interface 8 and measuring device 10 through measuring device interface 9. Provided with computer system 6 are display 12 which may be a color monitor, keyboard 14 for entering user commands, and pointing device 15 such as a mouse for pointing to and for manipulating graphical user interfaces and other objects displayed on display 12.

Computer system 6 also includes a mass storage device such as fixed disk 16. In the first embodiment of the invention, this mass storage device is for storing computer-executable process steps for a color calibration program including a negotiation controller according to the invention, other application programs, and an operating system including a printer driver and a measuring device driver. Such storage may also be provided by a CD-ROM (not shown).

It should be understood that, although a programmable general-purpose computer is shown in FIG. 1, a dedicated computer terminal or other type of data processing equipment can utilize the present invention.

Figure 2:
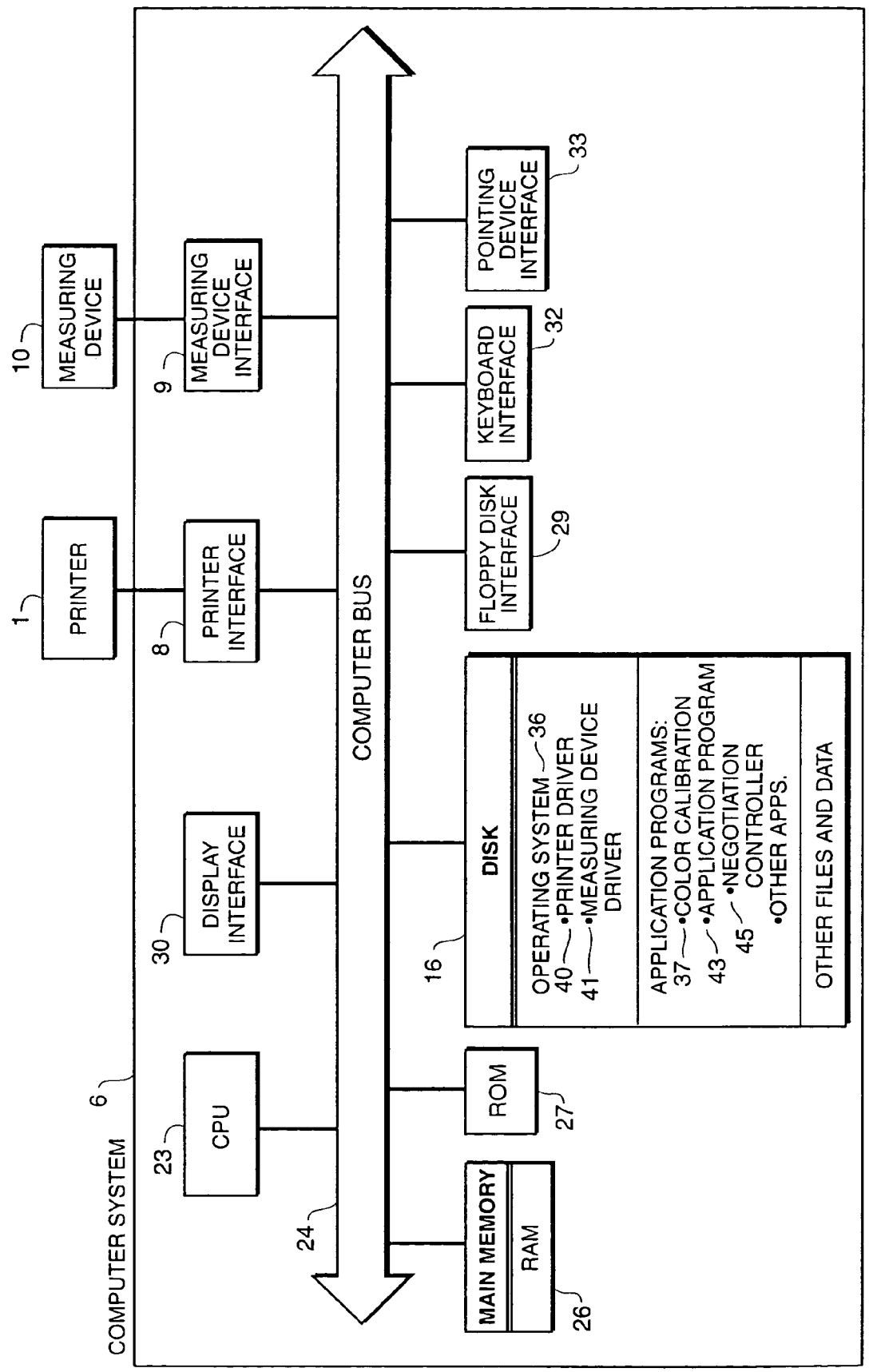
FIG. 2 is a detailed block diagram showing the internal architecture of the computer system shown in FIG. 1.

FIG. 2 is a detailed block diagram showing the internal architecture of computer system 6. As shown in FIG. 2, computer system 6 includes central processing unit 23 which interfaces with computer bus 24. Also interfacing with computer bus 24 are fixed disk 16, main memory is (RAM) 26, read only memory (ROM) 27, floppy disk interface 29, display interface 30 to display 12 (not shown), keyboard interface 32 to keyboard 14 (not shown), pointing device interface 33 to pointing device 15 (not shown), printer interface 8 to color printer 1, and measuring device interface 9 to measuring device 10.

Main memory 26 interfaces with computer bus 24 so as to provide RAM storage to CPU 23 during execution of software applications. More specifically, CPU 23 loads process steps from fixed disk 16, another storage device, or some other source such as a network (not shown), into main memory 26. CPU 23 then executes the stored process steps from main memory 26 in order to execute application programs. Data such as print data, layout data, and color measurement data can be stored in main memory 26, where the data can be accessed by CPU 23 during execution of the process steps.

In the embodiment shown in FIG. 2, fixed disk 16 typically contains operating system 36, application programs 37, and other files and data. Operating system 36 in this embodiment includes printer driver 40 and measuring device driver 41. The operation of these drivers is explained, in more detail below with reference to FIGS. 3 to 5.

Application programs 37 in this embodiment include color calibration program 43. Included with the color calibration program is negotiation controller 45 according to the invention. The operation of color calibration program 43 and negotiation controller 45 also is explained in more detail below with reference to FIGS. 3 to 5.

Figure 3:
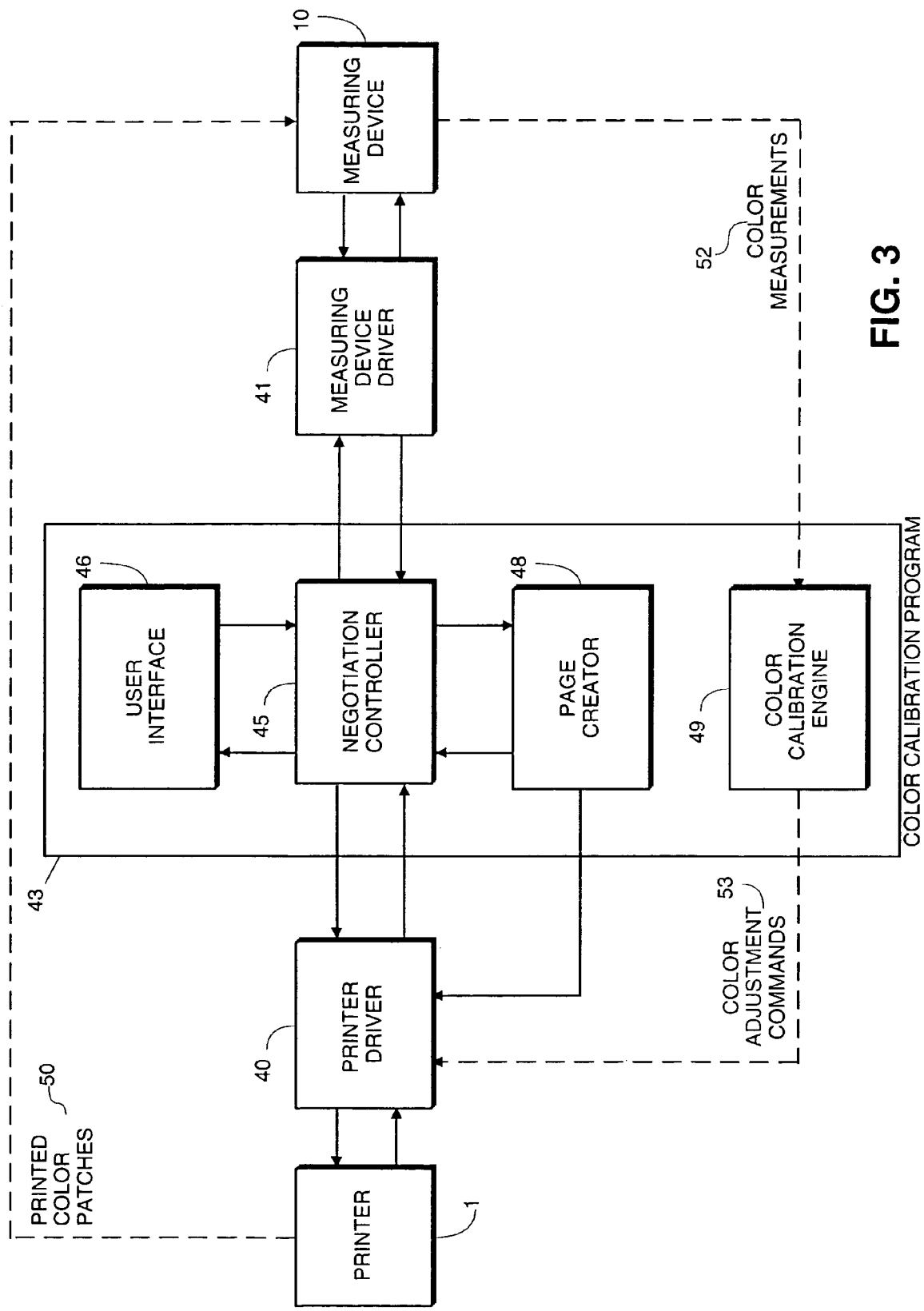
FIG. 3 is a block diagram showing a color calibration program for calibrating color fidelity of a color printer according to a first embodiment of the invention.

FIG. 3 is a block diagram showing color calibration program 43 for calibrating color fidelity of a color printer according to the first embodiment of the invention. As discussed above, color calibration program 43 includes negotiation controller 45 for negotiating a layout of print data for printing color patches for the color calibration. Also included is user interface 46 which provides a user interface to negotiation controller 45, for example by displaying a graphical user interface on display 12 which can be manipulated with keyboard 14 and pointing device 15.

Color calibration program 43 also includes page creator 48 and color calibration engine 49. Page creator 48 is connected to negotiation controller 45 and printer driver 40. Page creator 48 receives layout information from negotiation controller 45, and based in part on this layout information, sends print jobs for printing color patches to printer driver 40.

Color calibration engine 49 is provided for performing any necessary calculations for calibrating color printer 1. Color calibration engine 49 receives color measurements 52 from a color measuring device and generates color adjustment commands 53 based on these color measurements. These color adjustment commands are sent to printer driver 40 for adjusting color fidelity of color printer 1.

As shown in FIG. 3, in this embodiment printer driver 40 is connected to negotiation controller 45, page creator 48, color calibration engine 49, and printer 1. Printer driver 40 communicates with negotiation controller 45 during negotiation of a layout for print data, as explained in more detail with reference to FIGS. 4A, 4B and 5 below. Printer driver 40 receives print jobs from page creator 48 and instructs color printer 1 to print on a recording medium based on the print jobs. Printer driver 40 also receives color adjustment commands 53 from color calibration engine 49 and performs color fidelity adjustments of color printer 1 based on these commands.

Color printer 1 is connected to printer driver 40. In response to instructions from printer driver 40, color printer 1 prints printed color patches 50 on a recording medium.

Also shown in FIG. 3 is measuring device driver 41. In this embodiment of the invention, measuring device driver 41 is connected to negotiation controller 45 and measuring device 10. Measuring device driver 41 interacts with negotiation controller 45 so as to determine a layout for color patches, as explained in more detail with reference to FIGS. 4A, 4B and 5 below. Measuring device driver 41 communicates with measuring device 10 so as to control measuring device 10 in measuring printed color patches 50 input thereto. Measuring device 10 generates color measurements 52 based on these color patches.

Figure 4A:
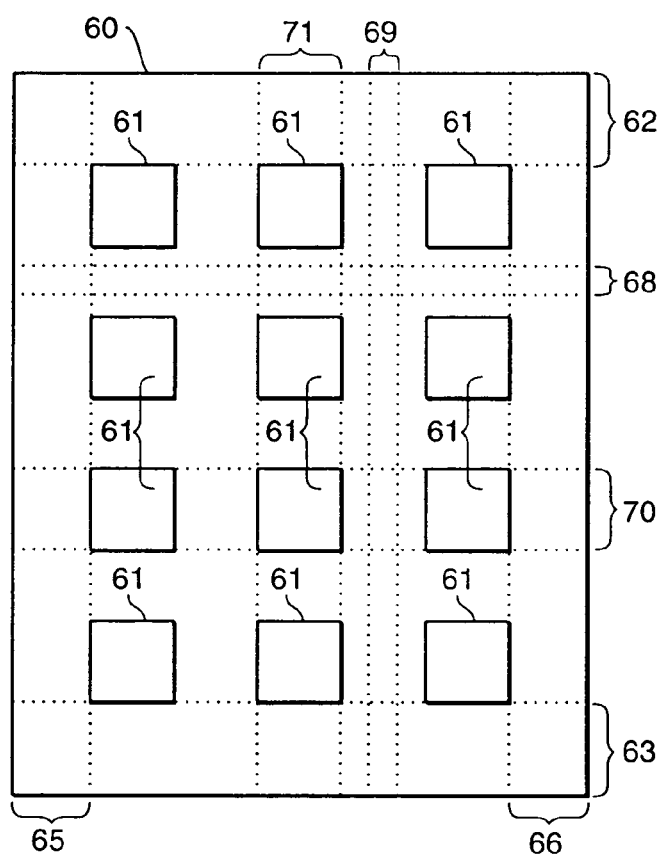
FIGS. 4A and 4B show examples of layouts that can be processed properly by different color measuring devices.
Figure 4B:
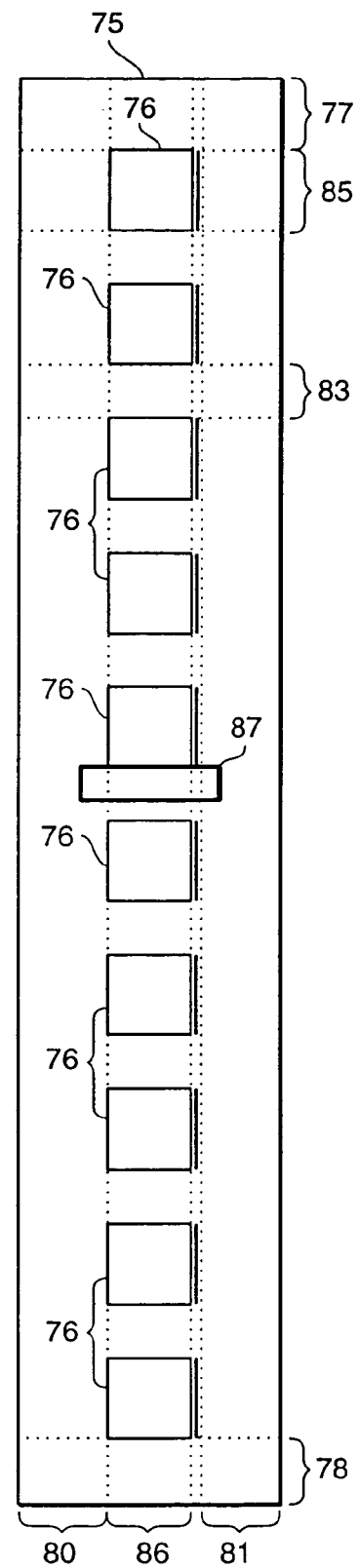

FIGS. 4A and 4B show examples of layouts that can be processed properly by different color measuring devices. FIG. 4A shows sheet 60, which illustrates constraints for a layout appropriate for input of color patches to XY table 2 or to properly-calibrated flatbed scanner 5. Depending on the XY table or flatbed scanner, layout of color patches 61 on sheet 60 can be constrained by all, some, or none of the illustrated constraints.

Shown on sheet 60 are minimum top margin 62, minimum bottom margin 63, minimum left margin 65, and minimum right margin 66. These margins define a printable area on sheet 60 within which color patches 61 must be printed. Minimum distance 68 defines a minimum vertical separation between color patches 61, and minimum distance 69 defines a minimum horizontal separation between color patches 61. Likewise, minimum height 70 defines a minimum height for color patches 61, and minimum width 71 defines a minimum width for color patches 61.

FIG. 4B shows strip 75 of color patches 76, which illustrates constraints for a layout appropriate for input of color patches to strip reader 3. The layout of color patches 76 on strip 75 can be constrained by all, some, or none of the illustrated constraints.

Shown on strip 75 are minimum top margin 77, minimum bottom margin 78, minimum left margin 80, and minimum right margin 81. These margins define an area in which color patches 76 must be printed in order for the color patches to be processed properly by strip reader 3. Also shown are minimum vertical distance 83 of separation between color patches 76, minimum patch height 85, and minimum patch width 86.

Some strip readers require a separator to be printed between certain patches, for example between two lighter patches printed adjacent each other. Separator region 87 is an example of a region in which such a separator can be printed. Similar separator regions can be disposed between the regions for each adjacent pair of color patches.

If color patches are to be input to hand-held measuring device 4 that reads individual color patches, either sheet 60 or strip 75 is appropriate. The constraints for the layout for input to a hand-held measuring device typically include minimum patch height and patch width so that the hand-held measuring device can be properly positioned.

Figure 5:
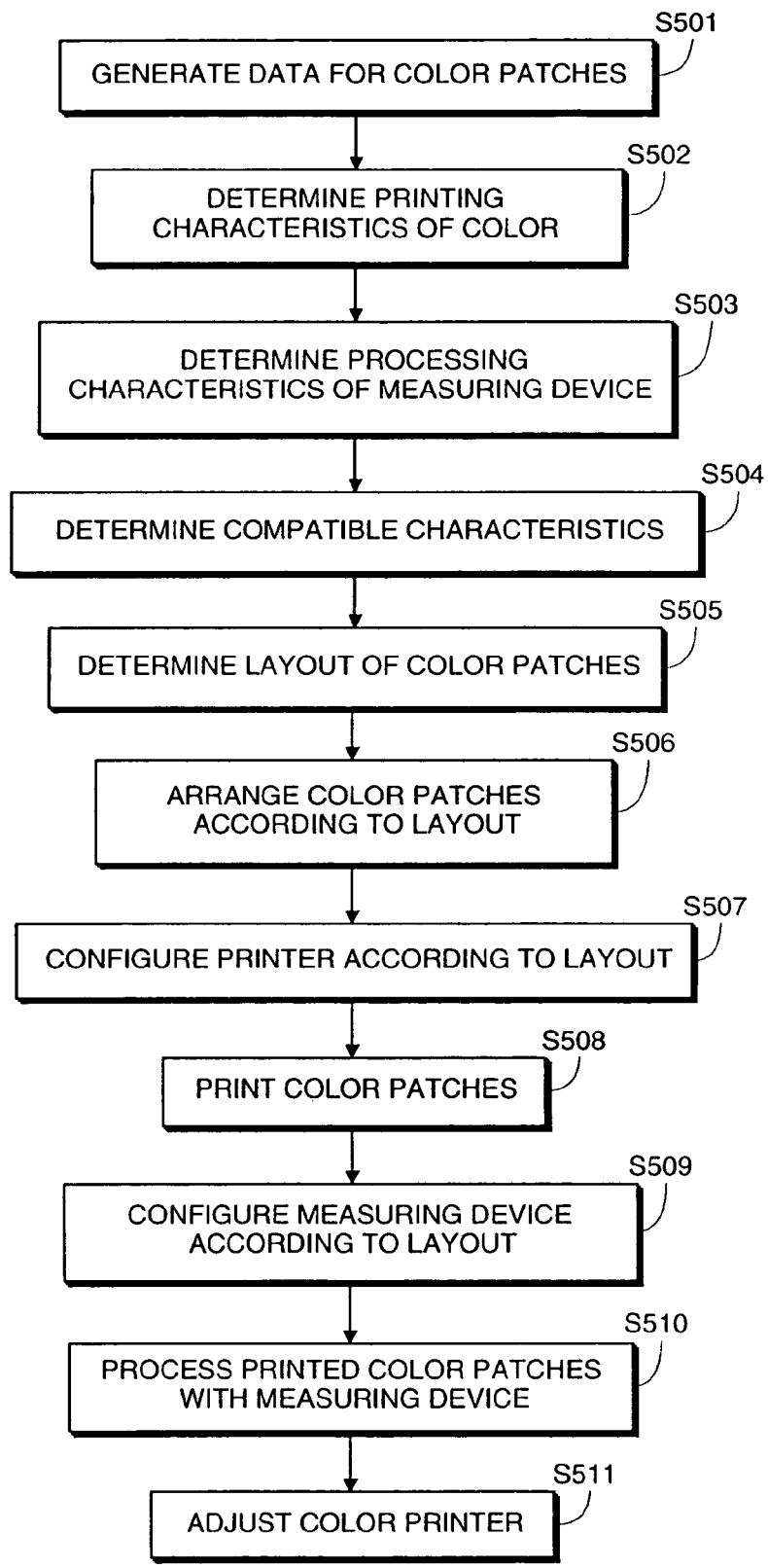
FIG. 5 is a flowchart for explaining calibration of color fidelity of a color printer according to the invention, including negotiation of a layout for printed color patches for the color calibration operation.

FIG. 5 is a flowchart for explaining calibration of color fidelity of color printer 1 according to the invention, including negotiation of a layout for printed color patches 50.

Briefly, according to FIG. 5, color patches are printed onto a recording medium, and the recording medium is processed by a color measuring device so as to perform color calibration of the color printer. In order to determine a layout for the color patches, printing capabilities of the color printer are determined. The printing capabilities include at least one valid size for the recording medium and at least one printable area on the recording medium. Processing capabilities of the color measuring device are also determined. The processing capabilities include at least one valid size for the recording medium, at least one area on the recording medium that can be processed by the color measuring device, and a minimum distance of separation between color patches. Compatible capabilities are thereafter determined between the printing capabilities of the color printer and the processing capabilities of the color measuring device. Based on the compatible capabilities, the invention determines the layout of the color patches.

In more detail, in step S501, color calibration engine 49 generates data for color patches for calibrating color fidelity of color printer 1. These color patches preferably include colors that span the colors that color printer 1 can print. Accordingly, color measurement of these color patches provide color calibration engine 49 with information sufficient for making color adjustments to color printer 1.

In step S502, negotiation controller 45 determines printing capabilities of color printer 1. In this embodiment, negotiation controller 45 communicates with printer driver 40, or with color printer 1 through printer driver 40, so as to determine these printing capabilities. Preferably, the printing capabilities include at least one valid size for a recording medium and at least one valid area on the recording medium on which color printer 1 can print.

Negotiation controller 45 in step S503 determines processing capabilities of measuring device 10. In this embodiment, negotiation controller 45 communicates with measuring device driver 41, or measuring device 10 through measuring device driver 41, so as to determine these processing capabilities. Preferably, the processing capabilities include constraints on the recording media input to measuring device 10, as well as constraints on color patches printed on the recording media, as illustrated in FIGS. 4A and 4B. Examples of these constraints include at least one valid size for the recording medium, at least one area on the recording medium that can be processed by the color measuring device, a minimum distance of separation between color patches, and a minimum size for the color patches.

Negotiation controller 45 in step S504 determines compatible capabilities between the printing capabilities of color printer 1 and the processing capabilities of measuring device 10. Preferably, negotiation controller 45 first determines common capabilities between the printing capabilities and the processing capabilities. For example, if color printer 1 is capable of printing on 8½×11 paper, legal paper, and A4 paper, and measuring device 10 is capable of processing A3 and A4 papers, then the common capabilities include using A4 paper. Common capabilities preferably determined by negotiation controller 45 include media size, printable area (i.e., margins), spacing between color patches, size of color patches and the like.

If the common capabilities between the printing capabilities and the processing capabilities result in more than one possible layout, user interface 46 preferably allows a user to choose a particular layout. In more detail, user interface 46 preferably displays layout information on display 12 for the possible layouts, and a user selects a particular layout using keyboard 14 and pointing device 15. Alternatively, negotiation controller 45 can include an expert system for determining a particular layout. This expert system preferably communicates with color printer 1 and measuring device 10 so as to negotiate a suitable layout.

Negotiation controller 45 communicates the determined layout to page creator 48. In step S506, page creator 48 configures the print data generated in step S501 so as to arrange the color patches according to the determined layout.

In step S507, negotiation controller 45 preferably configures color printer 1 in accordance with the determined layout. For example, negotiation controller 45 sets a duplex mode for color printer 1 in accordance with the determined layout. In order to configure color printer 1, negotiation controller 45 communicates with color printer 1 through printer driver 40.

In step S508, page creator 48 sends a print job to printer driver 40, thereby printing the color patches using color printer 1. The print job includes the print data for the color patches arranged in step S506 according to the determined layout. The color patches are printed by color printer 1 as printed color patches 50.

In step S509, negotiation controller 45 configures measuring device 10 in accordance with the determined layout. For example, negotiation controller 45 communicates the determined layout to measuring device driver 41. Measuring device driver 41 then instructs measuring device 10 to expect color patches of a particular size, printed on a particular-size recording medium, within particular margins, and separated by particular distances.

In step S510, printed color patches 50 are input to color measuring device 10, and color measuring device 10 processes printed color patches 50. Resulting color measurements 52 are then transmitted to color calibration engine 49.

Color calibration engine 49 adjusts color fidelity of color printer 1 in step S511, based on color measurements 52. In particular, color calibration engine 49 determines color adjustment commands 53 for adjusting color printer 1 based on color measurements 52. Color adjustment commands 53 are communicated to printer driver 40 so as to adjust color printer 1.

Because the layout of the color patches is determined based on compatible capabilities between the printing capabilities of the color printer and the processing capabilities of the color measuring device, the layout is ensured to be one that can be printed by the printer and processed properly by the color measuring device. Thus, color calibration can be carried out more easily than in conventional systems.

It should be noted that many of the steps shown in FIG. 5 can occur in orders different from those illustrated. In particular, steps S507 and S509 can occur substantially simultaneously, any time after step S505. In addition, the print job sent to printer driver 40 can configure color printer 1, thereby combining steps S507 and S508. Likewise, measuring device 10 can determine the layout through user input or by scanning or reading the recording media on which printed color patches 50 are printed. In addition, the measuring device can expect the layout to match a default or predetermined layout. Thus, step S509, which configures the measuring device, is optional. Other variations on the operation of the color calibration system exist which do not depart from the scope and spirit of the invention, some of which will be evident from the discussions of other embodiments of the invention which follow.

Second Embodiment

Figure 6:
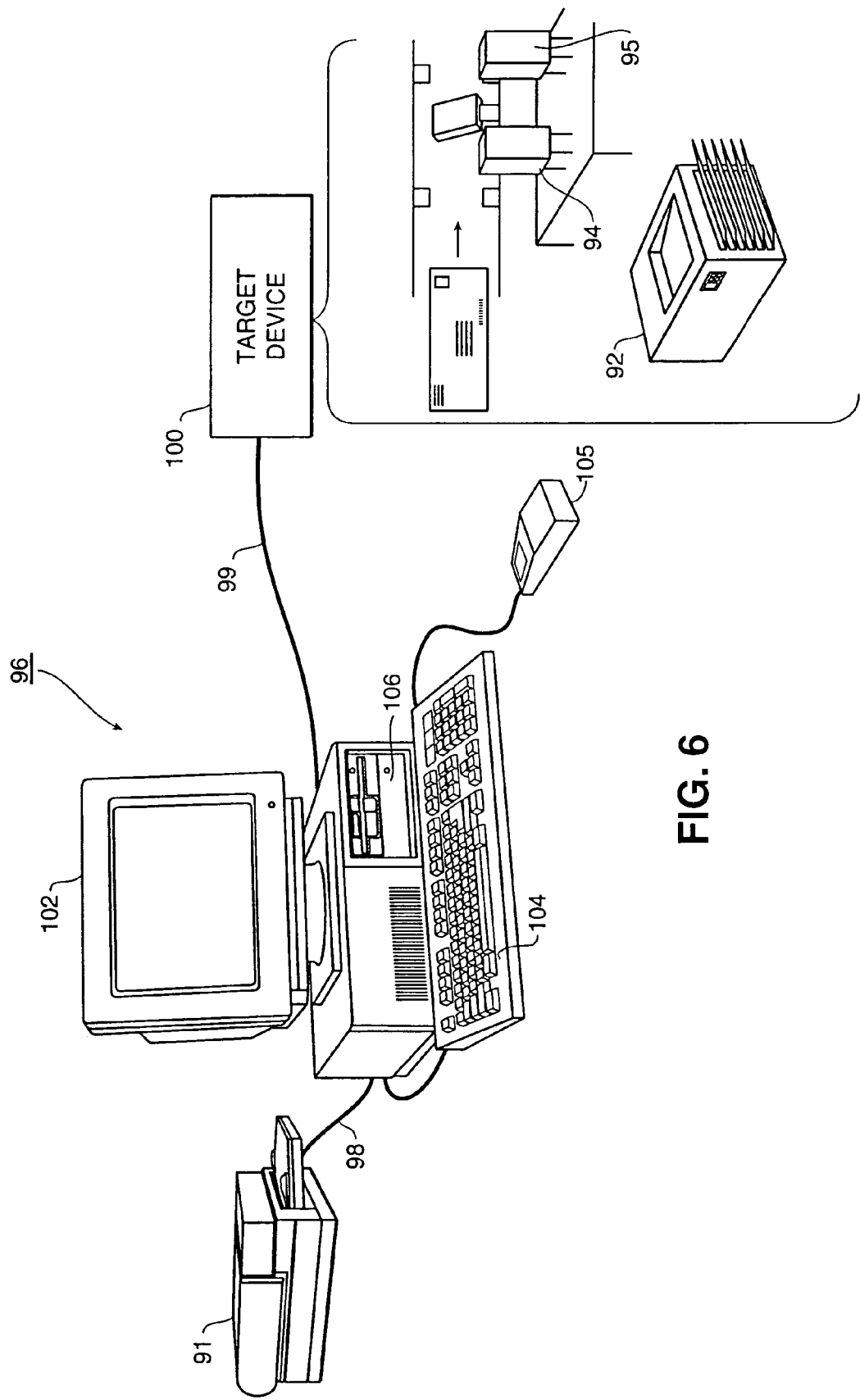
FIG. 6 is a representational view of a second embodiment of the invention, in which printed materials are processed using a target device different from a printer that generated the printed materials.

FIG. 6 is a representational view of a second embodiment of the invention, in which printed materials are processed using a target device different from a printer that generates the printed materials. Shown in FIG. 1 are printer 91 and computer system 96, together with a variety of target devices, such as automatic finishing device 92, bar code reader 94, and stamp reader 95.

Printer 91 is depicted in FIG. 1 as a laser printer. However, any printer capable of printing color images on recording media can be utilized by this embodiment of the invention, such as laser printers, ink jet printers, thermal printers, and dot matrix printers. In this regard, printer 91 can be the same printer as color printer 1 discussed above with respect to the first embodiment of the invention. However, printer 91 need not be a color printer, but rather can be a black and white printer. Printer 91 prints images in response to print jobs received over printer interface 98.

Target device 100 is a target device that processes printed materials. Examples of target device 100 include automatic finishing device 92, bar code reader 94, and stamp reader 95. Examples of finishing device 92 include, but are not limited to, automatic scoring devices, automatic folding devices, automatic stitching devices, automatic binding devices, automatic stamping devices, and automatic cutting devices. An example of bar code reader 94 is a bar code reader used to read bar codes printed on envelopes, such as for automatically sorting the envelopes. Other types of bar code readers can be utilized with the second embodiment of the invention. Examples of these other types of bar code readers are bar code readers used to track inventory and bar codes readers used at retail sales points. An example of stamp reader 95 is a stamp reader for reading stamps placed on or stamped on envelopes.

Other types of target devices also can be used with the second embodiment of the invention. In particular, the second embodiment is equally applicable for use with the color measuring devices discussed above with respect to the first embodiment of the invention.

Printed materials are input to each of the different target devices in different ways, with the printed materials arranged in different layouts. Depending on the capabilities of the specific target device that is utilized, different constraints are placed on the layouts so that the printed materials can be processed properly. Examples of the different constraints for the layouts are explained below with reference to FIGS. 9A to 9E.

As shown in FIG. 6, computer system 96 is connected to printer 91 through printer interface 98 and target device 100 through target device interface 99. As discussed above, examples of target device 100 include finishing device 92, bar code reader 94, and stamp reader 95.

Provided with computer system 96 are display 102 which may be a color monitor, keyboard 104 for entering user commands, and pointing device 105 such as a mouse for pointing to and for manipulating graphical user interfaces and other objects displayed on display 102.

Computer system 96 also includes a mass storage device such as fixed disk 106. In the second embodiment of the invention, this mass storage device is for storing computer-executable process steps for a text or graphics application program including a negotiation controller according to the invention, other application programs, and an operating system including a printer driver and a target device driver. Such storage may also be provided by a CD-ROM (not shown).

It should be understood that, although a programmable general-purpose computer is shown in FIG. 6, a dedicated computer terminal or other type of data processing equipment can utilize the present invention.

Figure 7:
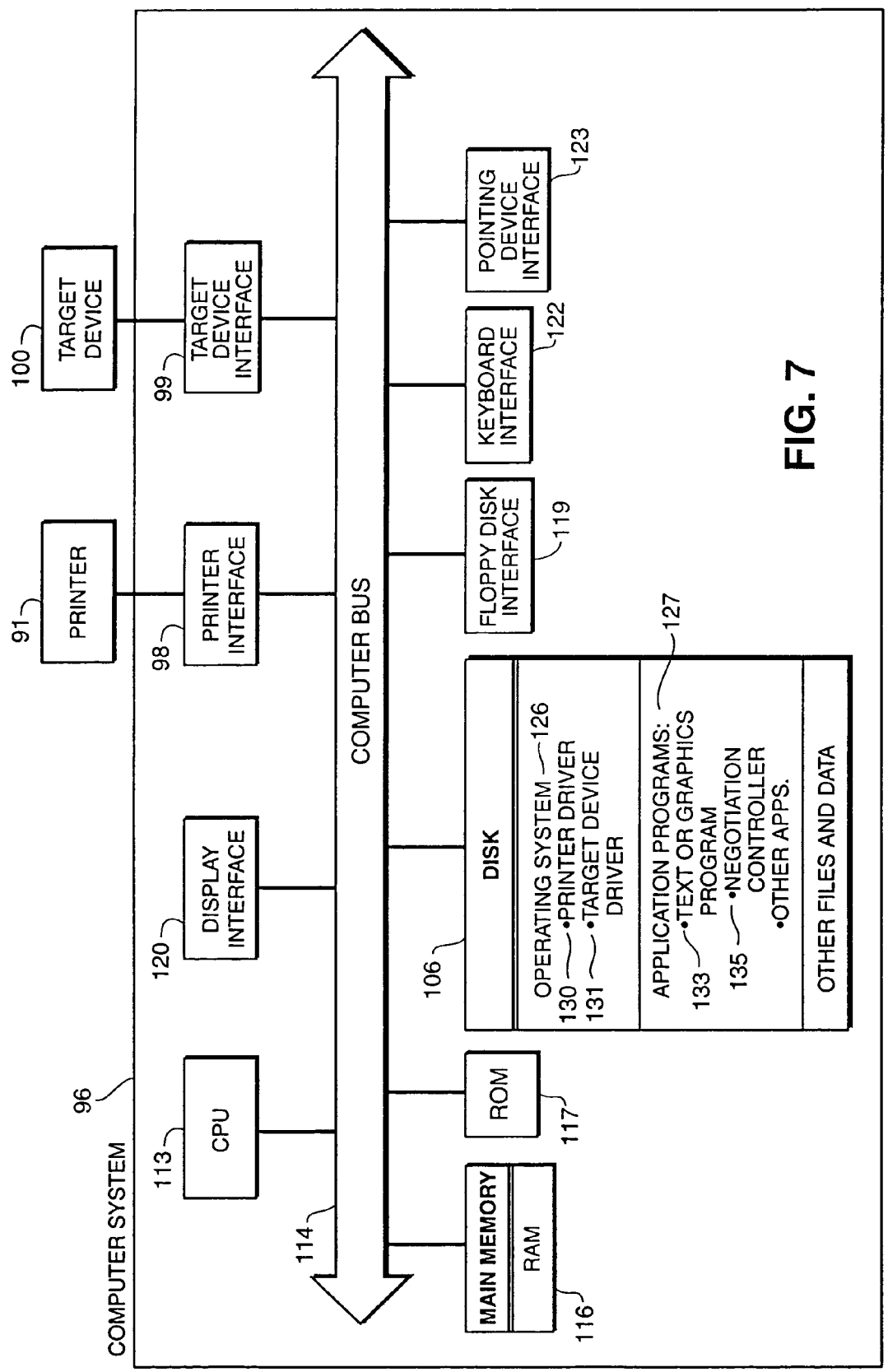
FIG. 7 is a detailed block diagram showing the internal architecture of the computer system shown in FIG. 6, arranged according to the second embodiment of the invention.

FIG. 7 is a detailed block-diagram showing the internal architecture of computer system 96, arranged according to the second embodiment of the invention. As shown in FIG. 7, computer system 96 includes central processing unit 113 which interfaces with computer bus 114. Also interfacing with computer bus 114 are fixed disk 106, main memory (RAM) 116, read only memory (ROM) 117, floppy disk interface 119, display interface 120 to display 102 (not shown), keyboard interface 122 to keyboard 104 (not shown), pointing device interface 123 to pointing device 105 (not shown), printer interface 98 to printer 91, and target device interface 99 to target device 100.

Main memory 116 interfaces with computer bus 114 so as to provide RAM storage to CPU 113 during execution of software applications. More specifically, CPU 113 loads process steps from fixed disk 106, another storage device, or some other source such as a network (not shown), into main memory 116. CPU 113 then executes the stored process steps from main memory 116 in order to execute application programs. Data such as print data and layout data can be stored in main memory 116, where the data can be accessed by CPU 113 during execution of the process steps.

In the embodiment shown in FIG. 7, fixed disk 106 preferably contains operating system 126, application programs 127, and other files and data. Operating system 126 in this embodiment includes printer driver 130 and target device driver 131. The operation of these drivers is explained in more detail below with reference to FIGS. 8 to 10.

Application programs 127 in this embodiment include text or graphics program 133, such as a word processing program, a drawing program, or a computer aided design (CAD) program. Included with the text or graphics program is negotiation controller 135 according to the invention. The operation of text or graphics program 133 and negotiation controller 135 also is explained in more detail below with reference to FIGS. 8 to 10.

Figure 8:
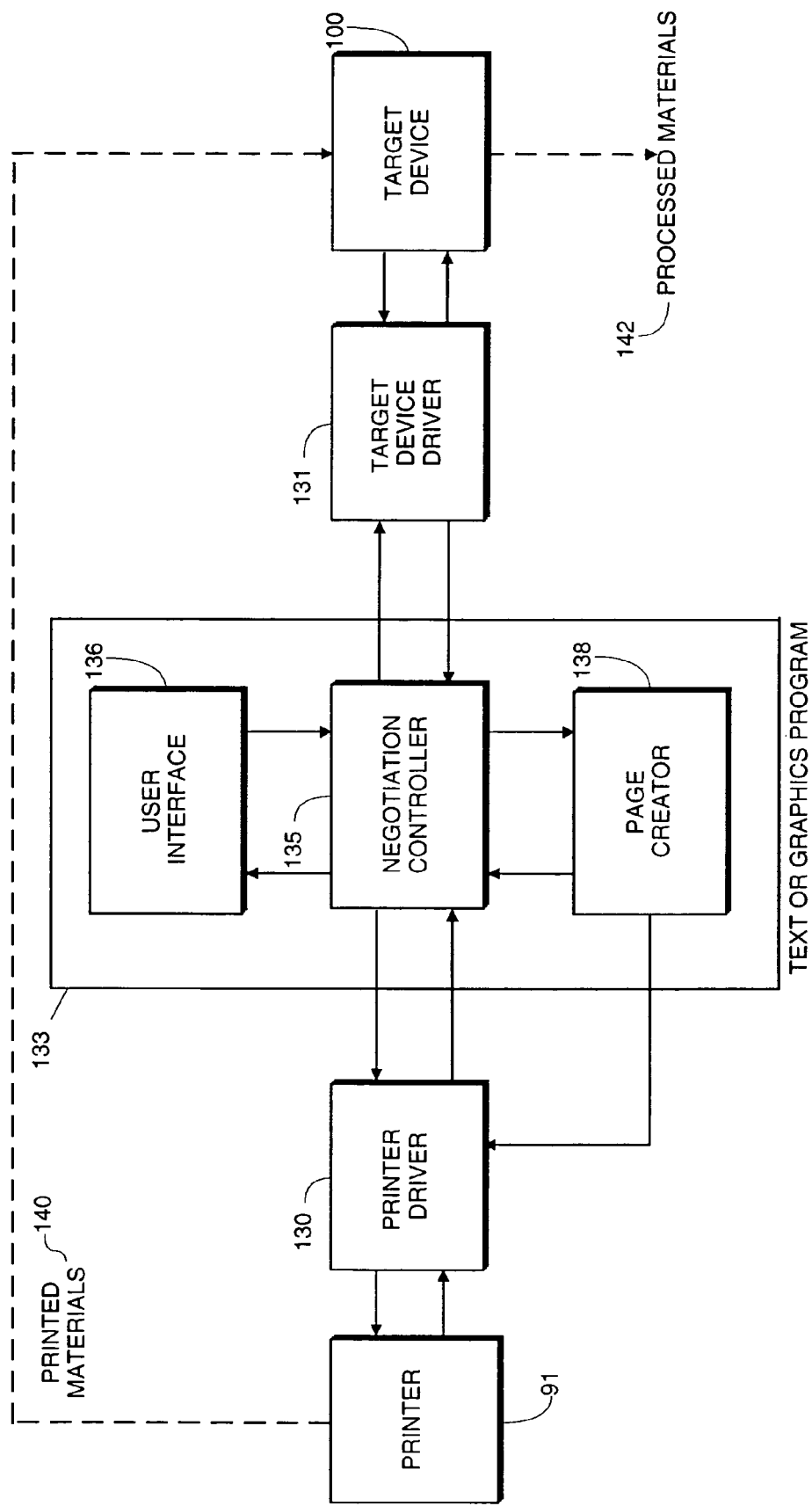
FIG. 8 is a block diagram showing a text or graphics program for generating printed materials according to the second embodiment of the invention.

FIG. 8 is a block diagram showing text or graphics program 133 for generating printed materials according to the second embodiment of the invention. One difference between the arrangements of text or graphics program 133 and of color calibration program 43 is that text or graphics program 133 does not necessarily receive output from a target device as input. Rather, the target device processes printed materials generated using the text or graphics program, and these processed materials can form a "final" product.

Text or graphics program 133 includes negotiation controller 135 for negotiating a layout of print data for printed materials. Also included is user interface 136 which provides a user interface to negotiation controller 135, for example by displaying a graphical user interface on display 102 which can be manipulated with keyboard 104 and pointing device 105.

Text or graphics program 133 also includes page creator 138. Page creator 138 is connected to negotiation controller 135 and printer driver 130. Page creator 138 receives layout information from negotiation controller 135, and based in part on this layout information, sends a print job for generating printed materials to printer driver 130.

As shown in FIG. 8, in this embodiment printer driver 130 is connected to negotiation controller 135, page creator 138, and printer 91. Printer driver 130 communicates with negotiation controller 135 during negotiation of a layout for print data, as explained in more detail with reference to FIGS. 9A to 9E and 10 below. Printer driver 130 receives print jobs from page creator 138 and instructs printer 91 to print on a recording medium based on the print jobs.

Printer 91 is connected to printer driver 130. In response to instructions from printer driver 130, printer 91 prints on a recording medium so as to generate printed materials 140.

Also shown in FIG. 8 is target device driver 131. In this embodiment of the invention, target device driver 131 is connected to negotiation controller 135 and target device 100. Target device driver 131 interacts with negotiation controller 135 so as to determine a layout for printed materials, as explained in more detail with reference to FIGS. 9A to 9F and 10 below. Target device driver 131 communicates with target device 100 so as to control target device 100 in processing printed materials 140. Target device 100 generates processed materials 142 from printed materials 140.

FIGS. 9A to 9E show examples of layouts that can be processed properly by different target devices. Many other examples exist of constraints for layouts that depend on processing capabilities of target devices. The layouts shown in FIGS. 9A to 9E are only meant to provide general examples of such constraints and how they relate to the processing capabilities of target devices.

FIG. 9A shows layout 150, which illustrates constraints for a layout appropriate for processing by an automatic binder. Included in layout 150 is minimum binding margin 151, which represents a smallest margin that the binder is capable of binding. From the perspective of a printer printing onto a recording medium for automatic binding, margin 151 defines area 152 that cannot be "processed" properly and area 153 that can be "processed" properly. In other words, after binding, materials printed in area 152 are hidden and therefore are not processed properly by the binder.

FIG. 9B shows layout 155, which illustrates constraints for a layout appropriate for processing by an automatic folder or an automatic folder/binder. Included in layout 155 are folding line 157 and minimum folding margins 158. Line 157 and margins 158 define area 160 that cannot be processed properly and areas 161 that can be processed properly by the automatic folder. It is, of course, possible for the layout to include multiple folds in directions different from that of line 157.

FIG. 9C shows layout 163, which illustrates constraints for a layout appropriate for processing by an automatic stapler. Included in layout 163 is staple area boundary 164, which denotes an area held together by a staple inserted by the automatic stapler. Boundary 164 defines area 165 that cannot be processed properly and area 166 that can be processed properly by the automatic stapler. The automatic stapler can, of course, use multiple staples positioned at different locations in layout 163.

FIG. 9D shows layout 169, which illustrates constraints for a layout appropriate for processing by an automatic cutting, scoring or stitching device. Included in layout 169 are cutting, scoring or stitching lines 171 and 172. Each of these lines has a margin associated therewith, namely margins 174 and 175. In the example shown in FIG. 9D, these lines and margins define cross-shaped area 177 that cannot be processed properly and areas 179 that can be processed properly by the automatic cutting, scoring or stitching device. It should be noted that these lines and margins need not be straight. Rather, irregular cutting lines and margins can constrain the layout, depending on the processing capabilities of the automatic cutting, scoring, or stitching device.

FIG. 9E shows an example of a layout for an envelope for processing by an automatic stamper, a bar code reader, or a stamp reader. Layout 182 in FIG. 9E includes stamp area 183 and bar code area 184. This layout illustrates that the area that can be processed properly can depend on the nature of the printed materials, as well as the type of target device.

If the printed materials are a stamp that is processed by a stamp reader, then stamp area 183 can represent the only area on the envelope that can be processed properly. Likewise, if the printed materials are a bar code that is processed by a bar code reader, then bar code area 184 can represent the only area that can be processed properly. Conversely, if the printed materials are an address and the layout is processed by an automatic stamper, then stamp area 183 can represent an area that cannot be processed properly, as that area would be covered by the stamp. The layout for the address would be constrained to area 185. In any case, the sizes of stamp area 183 and bar code area 184 depend on the capabilities of the target device.

Figure 10:
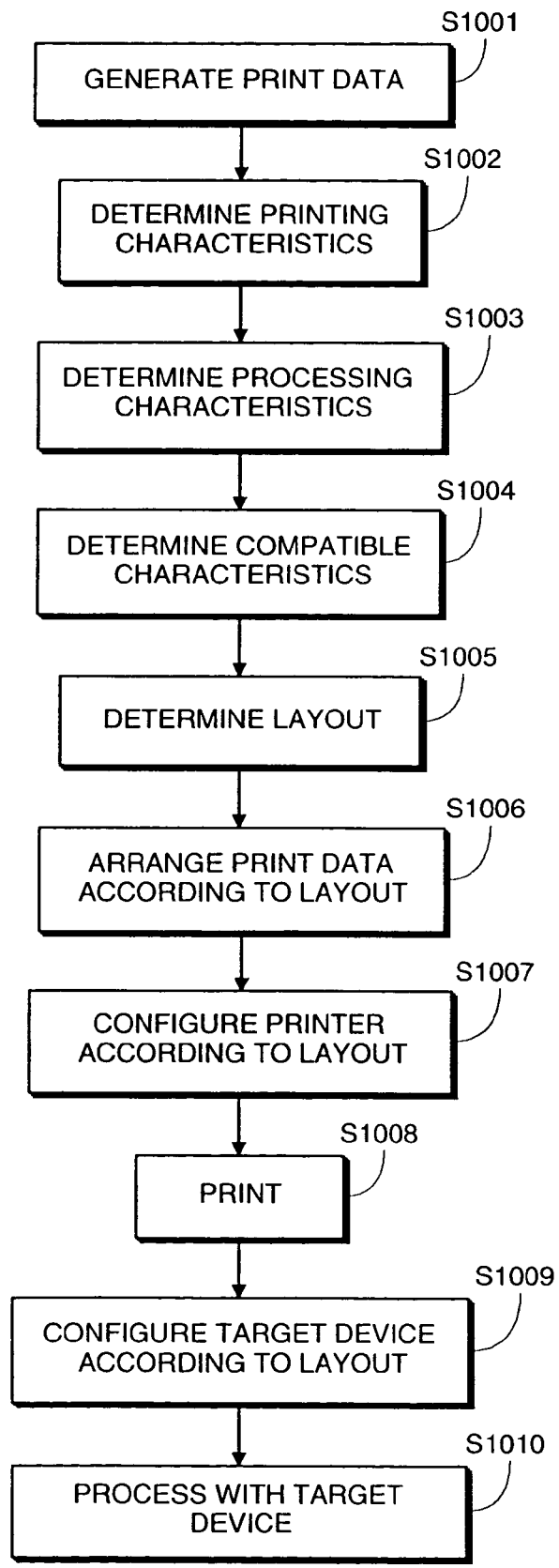
FIG. 10 is a flowchart for explaining negotiation of layout for print data according to the second embodiment of the invention.

FIG. 10 is a flowchart for explaining negotiation of layout for print data according to the second embodiment of the invention.

Briefly, according to FIG. 10, print data is printed by a printer onto a recording medium and the print data is processed by a target device different from the printer. In order to determine a layout for the print data, printing capabilities of the printer are determined. Processing capabilities of the target device also are determined. Then, the layout for the print data is determined based on compatible capabilities between the printing capabilities of the printer and the processing capabilities of the target device. Preferably, the layout is communicated to the printer and the target device, which are configured accordingly.

In more detail, in step S1001, page creator 138 generates print data for output by printer 91. This print data is for printed materials that will be processed by a target device other than a printer that generates the printed materials.

In step S1002, negotiation controller 135 determines printing capabilities of printer 91. In this embodiment, negotiation controller 135 communicates with printer driver 130, or with printer 91 through printer driver 130, so as to determine these printing capabilities. Preferably, the printing capabilities include at least one valid size for a recording medium and at least one valid area on the recording medium on which printer 91 can print.

Negotiation controller 135 in step S1003 determines processing capabilities of target device 100. In this embodiment, negotiation controller 135 communicates with target device driver 131, or target device 100 through target device driver 131, so as to determine these processing capabilities. Preferably, the processing capabilities include constraints on the recording media input to target device 100, as well as constraints on where data can be printed on the recording media in order for that data to be properly processed, as illustrated in FIGS. 9A to 9E.

Negotiation controller 135 in step S1004 determines compatible capabilities between the printing capabilities of printer 91 and the, processing capabilities of target device 100. Preferably, negotiation controller 135 first determines common capabilities between the printing capabilities and the processing capabilities. For example, if printer 91 is capable of printing on 8½11 paper, legal paper, or A4 paper, and target device 100 is capable of processing A3 and A4 papers, then the common capabilities include using A4 paper. Common capabilities preferably determined by negotiation controller 45 include media size, printable area (i.e., margins), and the like.

If the common capabilities between the printing capabilities and the processing capabilities result in more than one possible layout, user interface 136 preferably allows a user to choose a particular layout. In more detail, user interface 136 preferably displays layout information on display 102 for the possible layouts, and a user selects a particular layout using keyboard 104 and pointing device 105. Alternatively, negotiation controller 135 can include an expert system for determining a particular layout. This expert system preferably communicates with printer 91 and target device 100 so as to negotiate a suitable layout.

Negotiation controller 135 communicates the determined layout to page creator 138. In step S1006, page creator 138 configures the print data generated in step S1001 so as to arrange the print data according to the determined layout.

In step S1007, negotiation controller 135 preferably configures printer 91 in accordance with the determined layout. For example, negotiation controller 135 sets a duplex mode for printer 91 in accordance with the determined layout. In order to configure printer 91, negotiation controller 135 communicates with printer 91 through printer driver 130.

In step S1008, page creator 138 sends a print job to printer driver 130. The print job includes the print data arranged in step S1006 according to the determined layout. Printer driver 130 instructs printer 91 to generate printed materials 140 based on the print job.

In step S1009, negotiation controller 135 configures target device 100 in accordance with the determined layout. For example, negotiation controller 135 communicates the determined layout to target device driver 131. Target device driver 131 then instructs target device 100 to expect recording media of a particular size, with print data printed within particular areas.

In step S1010, printed materials 140 are input to target device 100, and target device 100 processes printed materials 140. Target device 100 generates processed materials 142 from printed materials 140. For example, target device 100 scores, folds, stitches, binds, stamps, cuts or reads printed materials 140. In many of these examples, processed materials 142 are physical items made from printed materials 140, such as a bound pamphlet or book. In other examples, processed materials 142 are data, such as data resulting from a read bar code.

Because the layout of printed materials 140 is determined based on compatible capabilities between the printing capabilities of printer 91 and the processing capabilities of target device 100, the layout is ensured to be one that can be printed by printer 91 and processed properly by the target device 100.

It should be noted that many of the steps shown in FIG. 10 can occur in different orders than those illustrated. In particular, steps S1007 and S1009 can occur substantially simultaneously, any time after step S1005. In addition, the print job sent to printer driver 130 can configure printer 91, thereby combining steps S1007 and S1008. Likewise, target device 100 can determine the layout through user input or by scanning or reading printed materials 140. In addition, the target device can expect the layout to match a default or predetermined layout. Thus, step S1009, which configures the target device, is optional. Other variations exist which do not depart from the scope and spirit of the invention.

Third Embodiment

In the third embodiment, the negotiation controller does not communicate directly with the printer or the target device so as to determine printing and processing capabilities. Instead, the negotiation controller communicates with a database, which preferably contains data of printing and processing capabilities for one or more printers and target devices.

Accordingly, as shown in FIG. 11, negotiation controller 135 communicates with database 190. In order to determine printing capabilities for printer 91 and processing capabilities for target device 100, negotiation controller 135 accesses database 190. As a result, a layout can be determined even if printer 91 and target device 100 are not connected to a computing device which runs text or graphics program 133.

In this regard, program 133 is shown connected to printer 91 through printer driver 130 in FIG. 11. However, this connection simply allows the program to send print data to printer 91 and to configure printer 91, possibly based on a determined layout. The print data is sent to printer 91 for generation of printed materials 140, which are input to target device 100 for processing.

As shown in FIG. 11, text or graphics program 133 does not ever have to communicate with target device 100. Of course, such communication could occur. Program 133 could communicate with target device 100 so as to configure that target device according to a determined layout or so as to receive data resulting from processing the printed materials, for example.

The third embodiment is illustrated in FIG. 11 as a variation of the second embodiment. However, it should be noted that the third embodiment is equally applicable to the first embodiment. In that case, target device 100 is a color measuring device, text or graphics program 133 is a color calibration program, and color measurements are returned from the color measuring device to the color calibration program. It is also possible to combine any of the features of all of the first through third embodiments.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for arranging print data according to a layout of the print data, wherein the print data includes color patches and is printed by a color printer onto a recording medium in which the recording medium is processed by a target device comprising a color measuring device different from the printer, comprising:

determining, via communication with the printer, printing capabilities of the printer, wherein the printing capabilities include a designation of a valid area on the recording medium on which the printer can print;

obtaining processing capabilities of the target device from the target device, wherein the processing capabilities are obtained from the target device via communication with the target device, wherein the processing capabilities include a designation of a printable area on the recording medium for which the target device has processing capabilities for processing properly, and further include a minimum distance of separation between color patches and a minimum size for the color patches;

determining layout of the print data based on compatible capabilities between the printing capabilities of the printer and the processing capabilities of the target device, wherein, in a case where the target device is a flatbed scanner, the color patches are two-dimensionally located on the recording medium, and in a case where the target device is a strip reader, the color patches are one-dimensionally printed on the recording medium in the layout and a separator is located between brighter patches of the color patches; and arranging print data for printout by the printer in accordance with the determined layout.

2. A method according to claim 1, wherein the step of determining layout further comprises the step of communicating with the printer so as to negotiate the layout.

3. A method according to claim 1, wherein the step of determining layout further comprises the step of communicating with the target device so as to negotiate the layout.

4. A method according to claim 1, further comprising the steps of communicating the layout of the print data to the printer and configuring the printer in accordance with the communicated layout.

5. A method according to claim 4, wherein the layout is communicated to the printer in a print job sent to the printer for printing the print data.

6. A method according to claim 1, further comprising the steps of communicating the layout of the print data to the target device and configuring the target device in accordance with the communicated layout.

7. A method according to claim 1, wherein the printing capabilities are determined through communication with the printer.

8. A method according to claim 1, wherein the printing capabilities are determined through communication with a database that stores data of printing capabilities of the printer.

9. A method according to claim 8, wherein the database further stores data of printing capabilities of plural different printers.

10. A method according to claim 1, wherein the printing capabilities include at least one valid size for the recording medium and at least one printable area on the recording medium.

11. A method according to claim 1, wherein the processing capabilities include at least one valid size for the recording medium and at least one area on the recording medium that can be processed.

12. A method according to claim 11, wherein the processing capabilities further include at least one area on the recording medium that cannot be processed.

13. A method according to claim 11, wherein the processing capabilities further include a minimum distance of separation for images on the recording medium that can be processed.

14. A method according to claim 1, wherein the color patches comprise color patches for performing color calibration of the color printer.

15. A method according to claim 1, wherein the target device is a device selected from the group consisting of a stamp reader, a bar code reader, an automatic scoring device, an automatic folding device, an automatic stitching device, an automatic binding device, an automatic stamping device, and an automatic cutting device.

16. An apparatus for arranging print data according to a layout of the print data, wherein the print data includes color patches and is printed by a color printer onto a recording medium in which the recording medium is processed by a target device comprising a color measuring device different from the printer, comprising:
  a first interface to a printer;
  a second interface to the target device;
  a memory including a region for storing computer-executable process steps; and
  a processor for executing the computer-executable process steps;
  wherein the computer-executable process steps include steps of: (a) determining, via communication with the printer, printing capabilities of the printer, wherein the printing capabilities include a designation of a valid area on the recording medium on which the printer can print; (b) obtaining processing capabilities of the target device from the target device, wherein the processing capabilities are obtained from the target device via communication with the target device, wherein the processing capabilities include a designation of a printable area on the recording medium for which the target device has processing capabilities for processing properly, and further include a minimum distance of separation between color patches and a minimum size for the color patches, (c) determining layout of the print data based on compatible capabilities between the printing capabilities of the printer and the processing capabilities of the target device, wherein, in a case where the target device is a flatbed scanner, the color patches are two-dimensionally located on the recording medium, and in a case where the target device is a strip reader, the color patches are one-dimensionally printed on the recording medium in the layout and a separator is located between brighter patches of the color patches; and (d) arranging print data for printout by the printer in accordance with the determined layout.

17. A negotiation controller in a computer, the negotiation controller comprising computer-executable process steps to arrange print data according to a layout of the print data, wherein the print data includes color patches and is printed by a color printer onto a recording medium in which the recording medium is processed by a target device comprising a color measuring device different from the printer, the computer-executable process steps comprising:
  code to determine, via communication with the printer, printing capabilities of the printer, wherein the printing capabilities include a designation of a valid area on the recording medium on which the printer can print;
  code to obtain processing capabilities of the target device from the target device, wherein the processing capabilities are obtained from the target device via communication with the target device, wherein the processing capabilities include a designation of a printable area on the recording medium for which the target device has processing capabilities for processing properly, and further include a minimum distance of separation between color patches and a minimum size for the color patches;
  code to determine layout of the print data based on compatible capabilities between the printing capabilities of the printer and the processing capabilities of the target device, wherein, in a case where the target device is a flatbed scanner, the color patches are two-dimensionally located on the recording medium, and in a case where the target device is a strip reader, the color patches are one-dimensionally printed on the recording medium in the layout and a separator is located between brighter patches of the color patches; and
  code to arrange print data for printout by the printer in accordance with the determined layout.

18. A computer-readable medium which stores a negotiation controller, the negotiation controller comprising computer-executable process steps to arrange print data according to a layout of the print data, wherein the print data includes color patches and is printed by a color printer onto a recording medium in which the recording medium is processed by a target device comprising a color measuring device different from the printer, the computer-executable process steps comprising:
  a first determining step to determine, via communication with the printer, printing capabilities of the printer, wherein the printing capabilities include a designation of a valid area on the recording medium on which the printer can print;
  an obtaining step to obtain processing capabilities of the target device from the target device, wherein the processing capabilities are obtained from the target device via communication with the target device, wherein the processing capabilities include a designation of a printable area on the recording medium for which the target device has processing capabilities for processing properly, and further include a minimum distance of separation between color patches and a minimum size for the color patches;
  a further determining step to determine layout of the print data based on compatible capabilities between the printing capabilities of the printer and the processing capabilities of the target device, wherein, in a case where the target device is a flatbed scanner, the color patches are two-dimensionally located on the recording medium, and in a case where the target device is a strip reader, the color patches are one-dimensionally printed on the recording medium in the layout and a separator is located between brighter patches of the color patches; and
  an arranging step to arrange print data for printout by the printer in accordance with the determined layout.

19. A method according to claim 1, wherein, in the determining step, the plurality of layouts are displayed on a display device in a case where a plurality of layouts are determined on the basis of compatible capabilities between the printing capabilities of the printer and the processing capabilities of the target device, and
  wherein any of the plurality of layouts displayed on the display device is manually selected.

20. A method according to claim 1, wherein, in the determining step, the layout of the print data is characterized by an area on the recording medium that is common between the valid area designated by the printing capabilities and a printable area designated by the processing capabilities that is properly processable by the target device.

* * * * *